United States Patent
Jarosz et al.

(10) Patent No.: US 10,990,817 B2
(45) Date of Patent: Apr. 27, 2021

(54) METHOD OF DETECTING FRAUD DURING IRIS RECOGNITION

(71) Applicant: IDEMIA IDENTITY & SECURITY FRANCE, Issy-les-Moulineaux (FR)

(72) Inventors: Hervé Jarosz, Issy-les-Moulineaux (FR); Emine Krichen, Issy-les-Moulineaux (FR); Jean-Noël Braun, Issy-les-Moulineaux (FR)

(73) Assignee: Idemia Identity & Security France, Issy les Moulineaux (FR)

( * ) Notice: Subject to any disclaimer, the term of this patent is extended or adjusted under 35 U.S.C. 154(b) by 155 days.

(21) Appl. No.: 16/032,641

(22) Filed: Jul. 11, 2018

(65) Prior Publication Data

US 2019/0019026 A1 Jan. 17, 2019

(30) Foreign Application Priority Data

Jul. 13, 2017 (FR) ...................................... 1756716

(51) Int. Cl.
| | |
|---|---|
| *G06K 9/00* | (2006.01) |
| *G06F 21/32* | (2013.01) |
| *G06K 9/46* | (2006.01) |
| *G06K 9/62* | (2006.01) |

(52) U.S. Cl.
CPC ......... *G06K 9/00617* (2013.01); *G06F 21/32* (2013.01); *G06K 9/0061* (2013.01); *G06K 9/4671* (2013.01); *G06K 9/623* (2013.01)

(58) Field of Classification Search
None
See application file for complete search history.

(56) References Cited

U.S. PATENT DOCUMENTS

| | | | |
|---|---|---|---|
| 2006/0202012 A1* | 9/2006 | Grano | G06Q 20/26 235/379 |
| 2013/0212655 A1* | 8/2013 | Hoyos | G06K 9/00906 726/5 |
| 2014/0278529 A1* | 9/2014 | Matos | G16H 80/00 705/3 |
| 2017/0046583 A1* | 2/2017 | Rodriguez | G06T 7/246 |
| 2017/0215071 A1* | 7/2017 | Jayanthi | H04M 1/72572 |
| 2018/0197005 A1* | 7/2018 | Hunt | G06K 9/00604 |

FOREIGN PATENT DOCUMENTS

KR  20180109109 A  * 10/2018  ......... G06K 9/00604

OTHER PUBLICATIONS

Lennart Berggren, Iridology: A critical review, ACTA Ophthalmologica, (Year: 1985).*

* cited by examiner

*Primary Examiner* — Mohammed Rachedine
(74) *Attorney, Agent, or Firm* — Muncy, Geissler, Olds & Lowe, P.C.

(57) ABSTRACT

A method of detecting fraud during identification by iris recognition, the method comprising the following steps:
  capturing an image of each eye of a person for identification (50), namely a first image (61) and a second image (71);
  extracting a first set of first characteristics from the first image (61);
  extracting a second set of second characteristics from the second image (71);
  evaluating a correlation coefficient between the first and second characteristics; and
  as a function of the value of the correlation coefficient, signaling an attempt at fraud or continuing with identification by eye recognition.
An identification terminal arranged to perform the method.

10 Claims, 6 Drawing Sheets

METHOD OF DETECTING FRAUD DURING IRIS RECOGNITION

FIELD OF THE INVENTION

The invention relates to the field of identification by iris recognition, and more particularly it relates to a method of detecting an attempt at fraud in such a mode of identification.

BACKGROUND OF THE INVENTION

A conventional method using iris recognition has a step of capturing an image of an eye of a person to be identified and of extracting a set of characteristics therefrom. The characteristics are then compared with a file of characteristics stored in association with identifiers of people in order to verify whether the person for identification appears in the file. The file may group together people that are considered as being undesirable ("nongrata") or people having particular rights (e.g. access rights). Wearing contact lenses that are cosmetic as contrasted to correcting contact lenses, e.g. lenses that change the color or the shape of the iris, can make it difficult or even impossible to identify a person for identification. Wearing such contact lenses makes fraud possible during identification by iris recognition.

OBJECT OF THE INVENTION

An object of the invention is to improve the reliability of identification by iris recognition.

SUMMARY OF THE INVENTION

To this end, there is provided a method of detecting fraud during identification by iris recognition, the method comprising the following steps:
  capturing an image of each eye of a person for identification, namely a first image and a second image;
  extracting a first set of first characteristics from the first image;
  extracting a second set of second characteristics from the second image;
  evaluating a correlation coefficient between the first and second characteristics; and
  as a function of the value of the correlation coefficient, signaling an attempt at fraud or continuing with identification by eye recognition.

This provides a method making it possible to identify a person wearing cosmetic contact lenses in order to defraud identification by iris recognition. Identifying characteristics that are highly correlated between the two eyes makes it possible to recognize elements that are artificial and thus to characterize an attempt at concealing the irises.

Cosmetic contact lenses often reproduce identical patterns on a single lens, so detecting an attempt at fraud is accelerated when extraction of the first set of first characteristics, and/or the second set of second characteristics is followed by a step of evaluating correlations within the first set of first characteristics and/or the second set of second characteristics. The evaluation of correlations in the image is accelerated in particular when it includes a step of evaluating the correlation between the characteristics of two regions of the image, the regions being angularly offset relative to an estimated center of the iris.

Also advantageously, evaluating correlations within the first set of first characteristics and/or the second set of second characteristics includes evaluating correlations of characteristics that are situated on a common direction passing through an estimated center of the iris. This makes it possible to identify quickly that cosmetic contact lenses are being worn if they have identical patterns along a direction passing through the center of the iris.

The method of the invention leads to more rapid detection of fraud when:
  extracting the first set of first characteristics is followed by a step of evaluating correlations within the first set of first characteristics and of selecting a first subset of first characteristics for which the correlation coefficient is greater than a first predetermined value; and
  extracting the second set of second characteristics of the second image is followed by a step of evaluating correlations within the second set of second characteristics and of selecting a second subset of second characteristics for which the correlation coefficient is greater than a second predetermined value. At the end of these steps, the method includes a step of evaluating correlations between first characteristics of the first subset and second characteristics of the second subset.

It is possible to detect that contact lenses are being worn quickly when the method includes an additional step of measuring a dimension of at least one of the irises, followed by a step of comparing the measurement with a reference value. This measurement serves to identify cosmetic lenses having a diameter that is greater than the mean diameter of a human iris.

Since a contact lens can be located off-center relative to the iris on which it is placed, the method of the invention is more effective when the extraction of the first set of first characteristics and/or of the second set of second characteristics includes a preliminary step of detecting a substantially circular outline corresponding to an outer boundary of the iris. This characteristic makes it possible to further accelerate the method of the invention when the first and/or second set of characteristics is extracted on a radial direction either going from the estimated center of the iris towards the outline of the iris, or from the outline of the iris towards the estimated center of the iris. Detection of fraud is further improved when the method of the invention includes a step of comparing the first characteristics and/or the second characteristics with stored characteristics representative of attempts at fraud.

The invention also provides a terminal including image capture means for capturing an image of each iris of a person for identification, analysis means for analyzing the images, and an interface arranged to signal a fraud detection, the terminal being arranged to perform the method as described above.

Other characteristics and advantages of the invention appear on reading the following description of particular, non-limiting embodiments of the invention.

BRIEF DESCRIPTION OF THE DRAWINGS

Reference is made to the accompanying figures, in which.

DETAILED DESCRIPTION OF THE INVENTION

Figure 1:
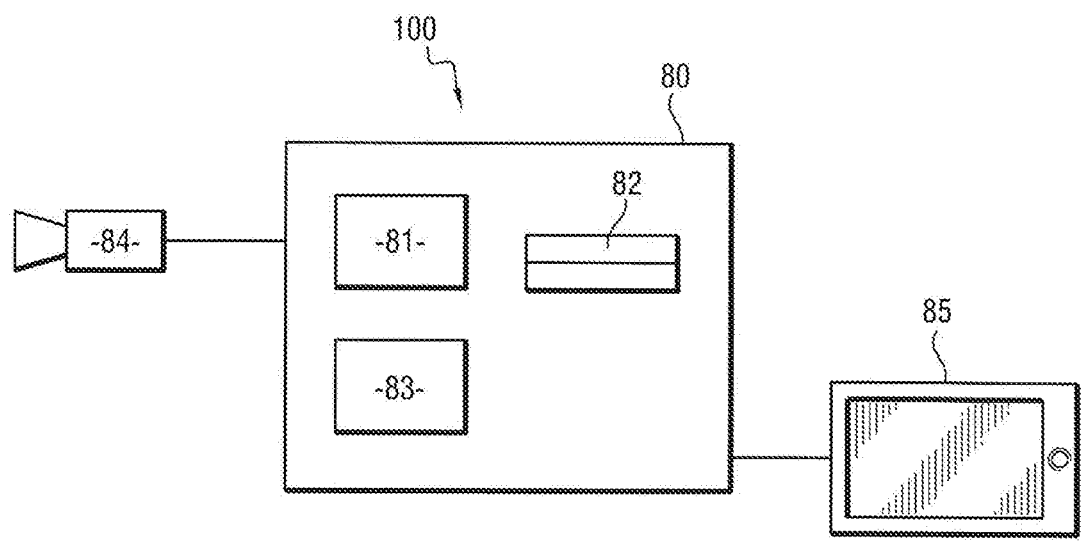
FIG. 1 is a diagrammatic view of an identification terminal of the invention.

With reference to FIGS. 1 to 7, the method of the invention for detecting fraud is performed by a terminal 100 for checking identity by iris recognition. The terminal 100 has a control unit 80 comprising an image processor module 81, a memory 82, and calculation means 83. The terminal 100 is connected to a high-definition camera 84 and to a touch screen 85. For exemplary purposes, the method of the invention is described in application to detecting a fraud during iris recognition identification when the fraud involves using cosmetic contact lenses, specifically novelty lenses 60.1 and 70.1 placed respectively on a first iris 60 and on a second iris 70 of a person 50 for identification.

Figure 2:
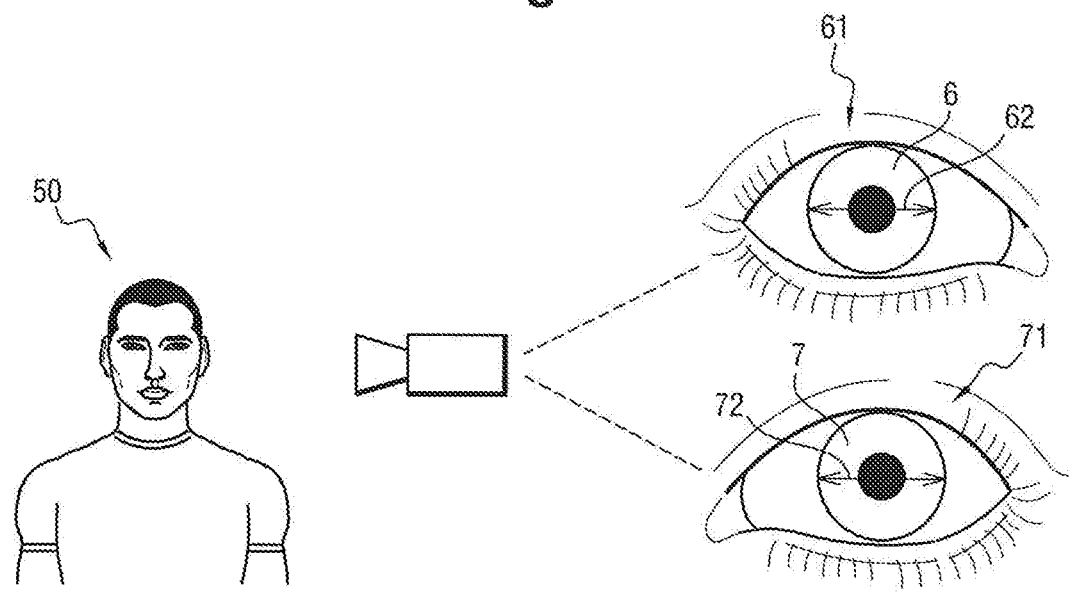
FIG. 2 is a diagrammatic view of a first step in the method of the invention.
Figure 3:
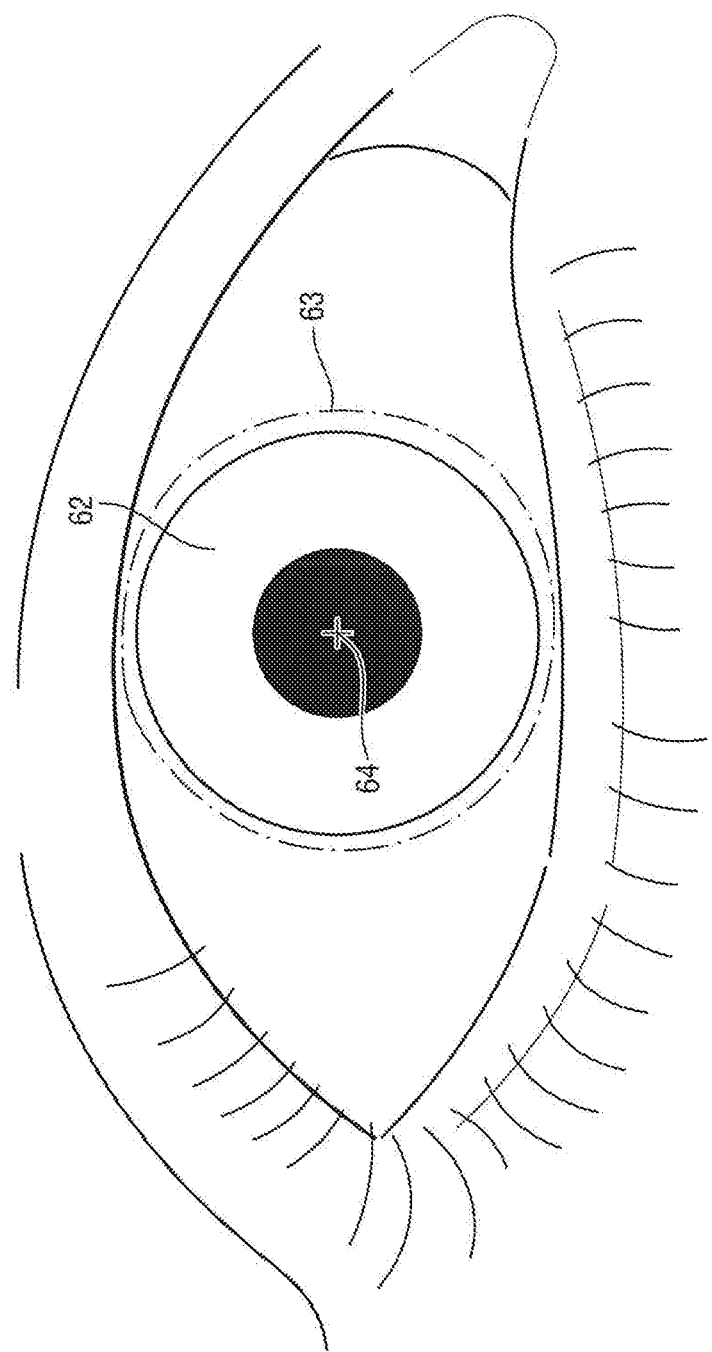
FIG. 3 is a diagrammatic view of a first image captured by the method of the invention.
Figure 4:
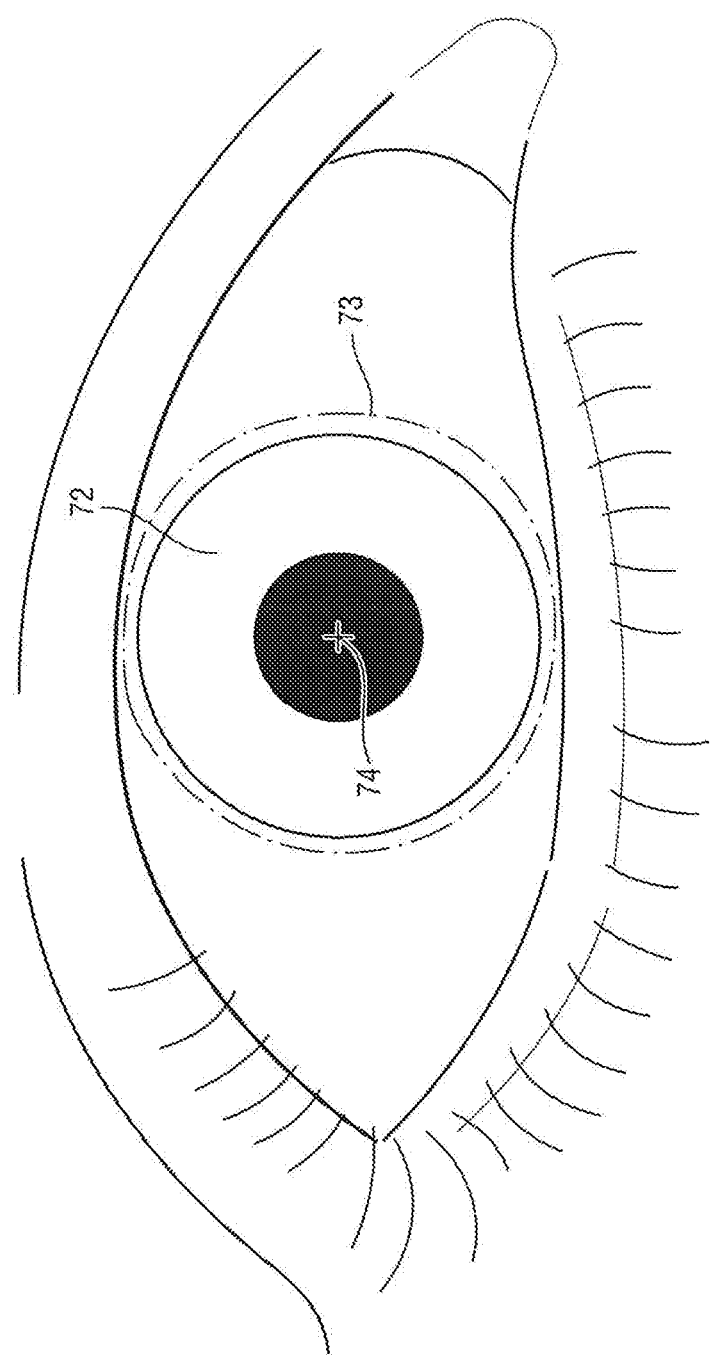
FIG. 4 is a diagrammatic view of a second image captured by the method of the invention.
Figure 5:
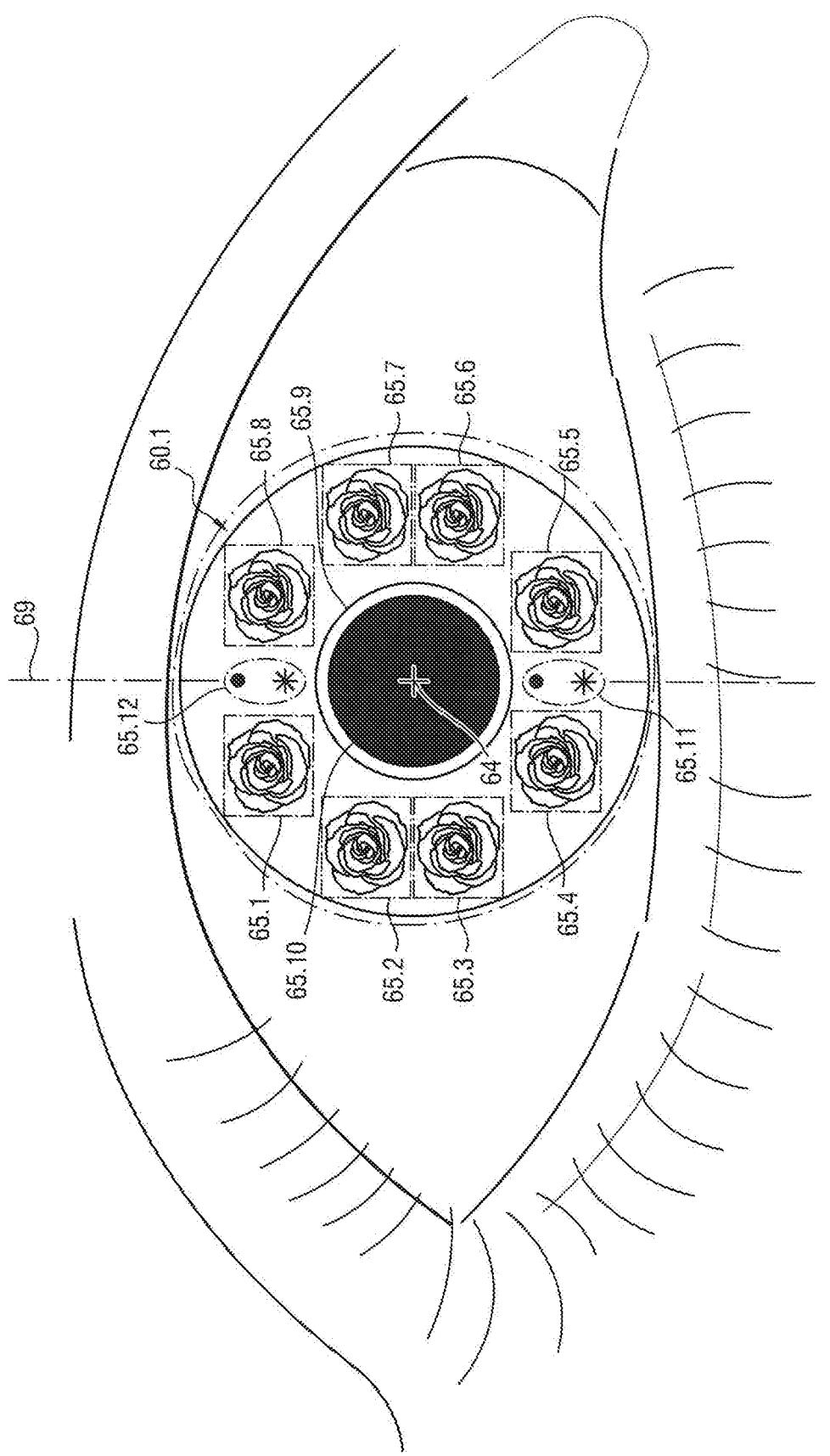
FIG. 5 is a diagrammatic view of the first image processed by the method of the invention.
Figure 6:
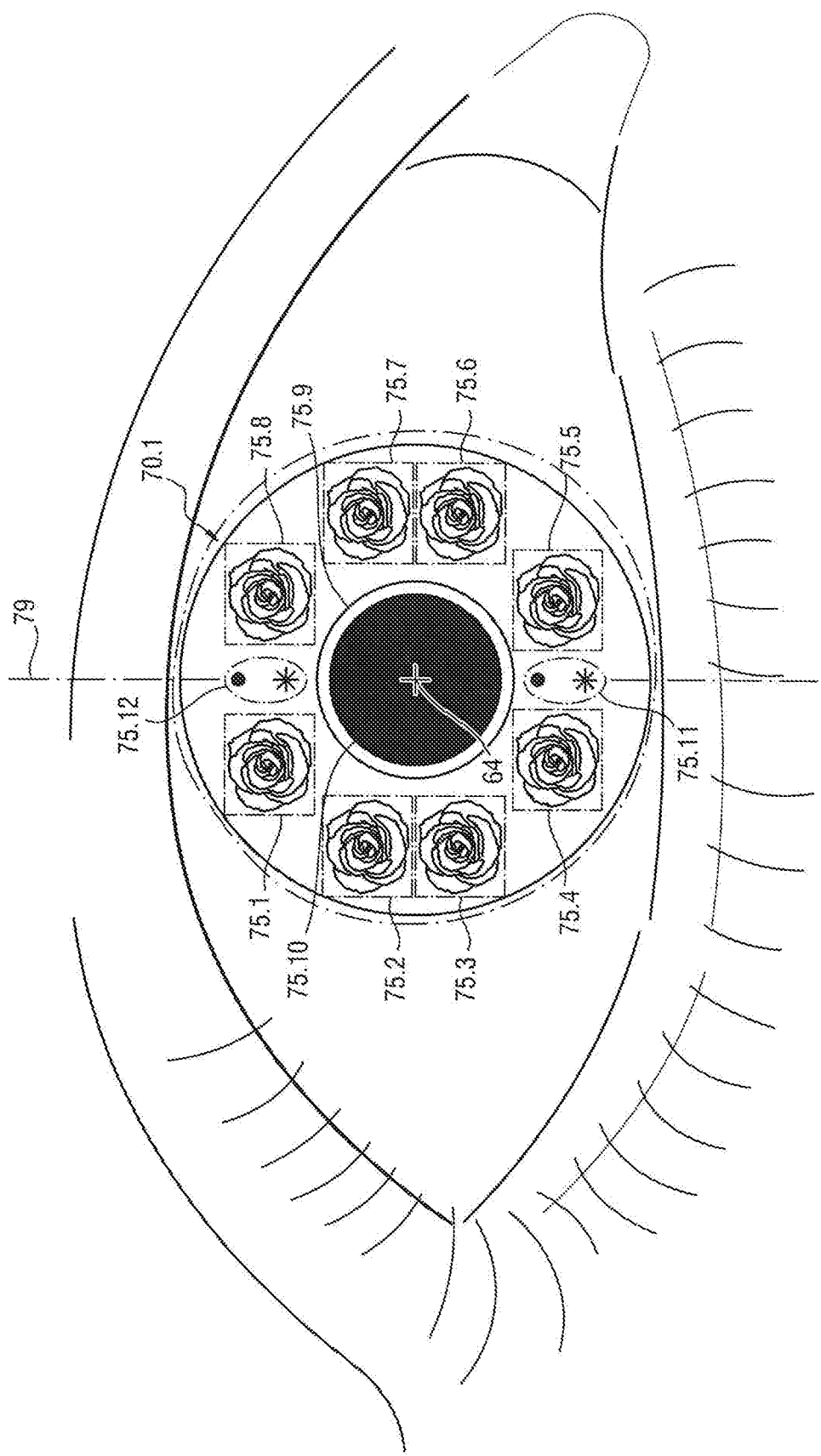
FIG. 6 is a diagrammatic view of the second image processed by the method of the invention.
Figure 7:
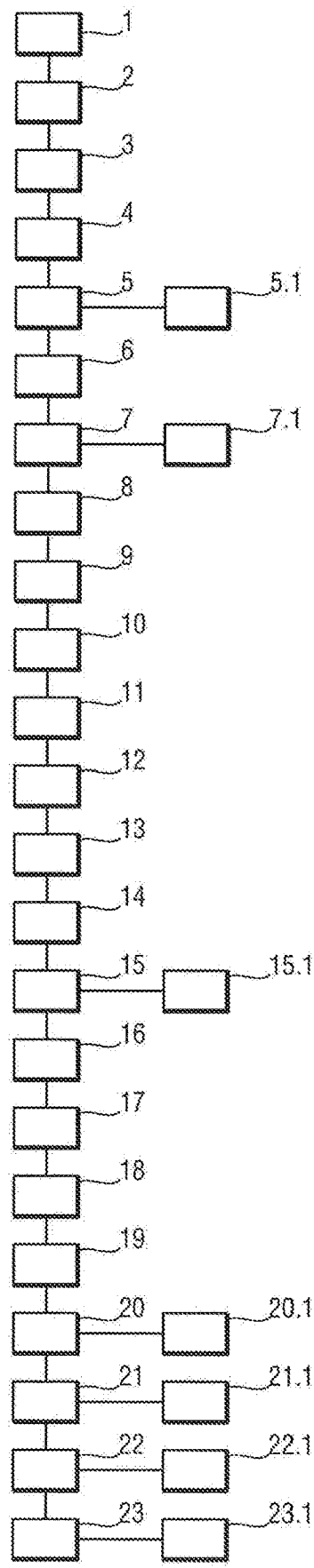
FIG. 7 is a flow chart of the steps of the method of the invention.

The fraud detection method is performed by the terminal 100, which executes the following steps:

step 1: using the camera 84 to capture an image of each eye of the person 50 for identification, namely a first image 61 and a second image 71 (FIG. 2);

step 2: taking a first measurement 62 of a dimension (specifically the diameter) of the first iris 60 in the first image 61;

step 3: taking a second measurement 72 of a dimension (specifically the diameter) of the second iris 70 in the second image 71;

step 4: comparing the first measurement 62 with a reference value 86, specifically constant and expressed in image pixels;

step 5: when the first measurement 62 is greater than the reference value 86, the terminal 100 detects a probability that the person 50 is wearing a cosmetic contact lens on the first eye and signals an attempt at fraud via the screen 85 (step 5.1);

step 6: comparing the second measurement 72 with a reference value 86, set at 11.6 millimeters (mm) in this example, and expressed in image pixels;

step 7: when the second measurement 72 is greater than the reference value 86, the terminal 100 detects a probability that the person 50 is wearing a cosmetic contact lens on the second eye and signals an attempt at fraud via the screen 85 (step 7.1);

step 8: detecting in the first image 61 a first substantially circular outline 63 corresponding to the outer boundary of the first iris 60;

step 9: estimating in the first image 61 the position of the center 64 of the first iris 60:

step 10: segmenting the first image 61 starting from the center 64 and going towards the first outline 63 of the first iris 60. In this example, this segmentation is performed by decomposition/fusion and terminates in identifying a plurality of regions 65.1 to 65.12 (FIG. 5);

step 11: detecting in the second image 71 a second substantially circularly outline 73 corresponding to the outer boundary of the second iris 70;

step 12: estimating in the second image 71 the position of the center 74 of the second iris 70; and step 13: segmenting the second image 71 starting from center 74 towards the second outline 73 of the second iris 70. In this example, this segmentation is performed by decomposition/fusion and terminates in identifying a plurality of regions 75.1 to 75.12 (FIG. 6).

In a step 14, the image processor module 81 extracts a first set 66 of first descriptors 67, preferably of the Iris code type, from the first image 61. In a step 15, the calculation means 83 evaluate correlations between the first descriptors 67 of the first set 66. When two or more descriptors 67 have a correlation coefficient greater than a threshold 90, the terminal 100 detects a probability that the person 50 is wearing a cosmetic contact lens on the eye shown in the first image and signals an attempt at fraud via the screen 85 (step 15.1).

In a step 16, the image processor module 81 extracts a second set 76 of second scale invariant feature transform (SIFT) descriptors 77 from the second image 71. In a step 17, the calculation means 83 evaluate correlations between the second descriptors 77 of the second set 76. When two or more second descriptors 77 have a correlation coefficient greater than the threshold 90, the terminal 100 detects a probability that the person 50 is wearing a cosmetic contact lens on the eye shown in the second image, and signals an attempt at fraud via the screen 85 (step 17.1).

Step 15 of evaluating correlations between the first descriptors 67 includes a step 15.2 of evaluating the correlation between at least one of the first descriptors 67 attached to a first region of the first iris 60—in this example the first descriptor 67.1 attached to the region 65.1—and at least one other one of the first descriptors 67 attached to a second region that is angularly offset from the first region about the estimated center 64 of the first iris 60—in this example the first descriptor 67.2 attached to the region 65.2. In the chosen example of a person 50 wearing a contact lens 60.1 having flower patterns, the calculation means 83 identify a correlation greater than the threshold 90 between the descriptors 67.1 to 67.8 attached to the regions 65.1 to 65.8. This high correlation represents the flower patterns of the lens 60.1 being repeated, and characterizes an attempt at fraud. The terminal 100 then signals an attempt at fraud (step 15.1).

Step 17 of evaluating correlations between the second descriptors 77 includes a step 17.2 of evaluating the correlation between at least one of the second descriptors 77 attached to a third region of the second iris 70—in this example the second descriptor 77.1 attached to the region 75.1—and at least one other one of the second descriptors 77 attached to a fourth region that is angularly offset from the third region about the estimated center 74 of the second iris 70—in this example the second descriptor 77.2 attached to the region 75.2. In the chosen example of a person 50 wearing a contact lens 70.1 having flower patterns, the calculation means 83 identify a correlation greater than the threshold 90 between the descriptors 77.1 to 77.8 attached to the regions 75.1 to 75.8. This high correlation is representative of the repeated flower patterns of the lens 70.1 and characterizes an attempt at fraud. The terminal 100 then signals an attempt at fraud (step 17.1).

In a step 18, the calculation means 83 select from the first set 66 of first descriptors 67 a first subset 68 comprising the descriptors 67.1 to 67.8 having a correlation coefficient greater than the threshold 90. In a step 19, the calculation means 83 also select from among the second set 76 of second descriptors 77, a second subset 78 comprising the descriptors 77.1 to 77.8 of correlation coefficient greater than the threshold 90.

In a step 20, the calculation means 83 evaluate a correlation coefficient between the first descriptors 67.1 to 67.8 of the first subset 68 and the second descriptors 77.1 to 77.8 of the second subset 78. In the chosen example, the calculation means 83 determine a high correlation coefficient (in this example greater than 70%) between each first descriptor 67.1 to 67.8 of the first subset 68 and each second descriptor 77.1 to 77.8 of the second subset 78. This high correlation represents the fact that each eye of the person 50 is wearing an identical contact lens 60.1 or 70.1 (as is general with cosmetic contact lenses) and characterizes an attempt at fraud. The terminal 100 then signals an attempt at fraud (step 20.1). When the correlation coefficient is small (less than 70%), the method moves on to the step 40 of continuing of performing identification by iris recognition.

In a second implementation, the step 15.2 of evaluating the correlation between one of the first descriptors 67 attached to a first region and another one of the first descriptors 67 attached to a second region that is angularly offset about the estimated center 64 of the first iris 60 may be replaced by or performed together with a step 21 of evaluating correlation of the first descriptors attached to zones situated in a common direction 69 passing through an estimated center 64 of the first iris 60. Such a step 21 makes it possible quickly to detect a pattern that is repeated in an angular direction and to identify a characteristic that is not natural. When the correlation coefficient between the first descriptors 67 of the first set 66—such as for example the first descriptors 67.11 and 67.12 attached to the zones 65.11 and 65.12—is high (in this example greater than 70%), the terminal 100 uses the screen 85 to signal an attempt at fraud (step 21.1).

Steps 22 and 22.1 identical to the steps 21 and 21.1 are applied to the second descriptors 77 of the second set 76.

During an optional additional step 23, the calculation means 83 compare the first descriptors 67 of the first set 66 and the second descriptors 77 of the second set 76 with the descriptors 87 stored in the memory 82 of the terminal 100, which correspond to descriptors coming from known cosmetic contact lenses and that are representative of attempts at fraud. When the correlation coefficient between one or more of the first or second descriptors 67 or 77 with one or more of the descriptors 87 is high (in this example greater than 70%), the terminal 100 uses the screen 85 to signal an attempt at fraud (step 23.1).

Naturally, the invention is not limited to the implementations described but covers any variant coming within the ambit of the invention as defined by the claims.

In particular:
although in this example the terminal has a high-definition motion picture camera, the invention is equally applicable to other means for capturing an image of each eye of a person for identification, such as for example a still camera, a scanner, an ultra high-definition camera, or a low-definition camera;

although in this example the terminal has an image processor module, the invention is equally applicable to other image analysis means, such as for example distinct software for image processing incorporated in the calculation means or an image recognition module incorporated in the camera;

although in this example the terminal has a touch screen, the invention is equally applicable to other types of interface arranged to signal an attempt at fraud, such as for example, a video screen, a siren, an indicator lamp;

although in this example the reference value with which the iris diameter measurements are compared is 11.6 millimeters, the invention is equally applicable to other reference values that may be expressed in pixels or in other units and depending on biometric values specific to a capture environment or population;

although in this example iris measurement and iris outline detection operations are carried out, it is also possible to measure the iris without also detecting the outline of the iris;

although in this example the first and second images are segmented by decomposition/fusion, the invention is equally applicable to other methods of segmenting images, such as for example a method of growing a region, a method by approaching boundaries, or a method by classification or by thresholding;

although in this example the image processor module extracts descriptors of the Iris code type, the invention is equally applicable to other types of first and second characteristic of the first and second images, such as for example SIFT, BRIEF, ORB, or BRISK descriptors;

although in this example correlations between the characteristics of a single image are evaluated between descriptors attached to regions that are angularly offset relative to an estimated center of the iris or that are situated on a direction passing through an estimated center of the iris, the invention is equally applicable to evaluating correlations between characteristics of a single image carried out between descriptors attached to regions derived from different segmentation or to regions taken at random;

although in this example a first subset is selected from the first characteristics of the first image and a second subset is selected from the second characteristics of the second image, and then correlations of the characteristics of the first subset with characteristics of the second subset are evaluated, the invention is equally applicable to evaluating correlations between the first characteristics and the second characteristics without prior selection of subsets;

although in this example a correlation between two characteristics is considered as being high when the correlation coefficient is greater than 70%, the invention is equally applicable to other values for said coefficient that may be adapted as a function of capture conditions or of other parameters, and may have a value that is greater than or less than 70%;

although in this example images are segmented in order to extract the characteristics in a radial direction starting from the outline of the iris and going towards the center of the iris, the invention is equally applicable to extracting sets of characteristics along a radial direction going from the estimated center of the iris towards the outline of the iris.

The invention claimed is:

1. A method of detecting fraud during identification by iris recognition, the method comprising the following steps:
capturing an image of each iris of a person for identification, namely a first image and a second image;
extracting a first set of first characteristics from the first image;
extracting a second set of second characteristics from the second image;
evaluating a correlation coefficient between the first and second characteristics; and
as a function of the value of the correlation coefficient, signaling an attempt at fraud or continuing with identification by iris recognition, wherein:
extracting the first set of first characteristics comprises a step of evaluating correlations within the first set of first characteristics and of selecting a first subset of first characteristics for which the correlation coefficient is greater than a first predetermined value; and extracting the second set of second characteristics comprises a step of evaluating correlations within the second set of second characteristics and of selecting a second subset of second characteristics for which the correlation coefficient is greater than a second predetermined value; and the method including a step of evaluating correlations between the first characteristics of the first subset of first characteristics and second characteristics of the second subset of second characteristics.

2. The method according to claim 1, wherein the extraction of the first set of first characteristics, and/or the extraction of the second set of second characteristics is followed by a step of evaluating correlations with said set of characteristics.

3. The method according to claim 2, wherein the step of evaluating the correlations within said set of characteristics comprises a step of evaluating the correlation between the characteristics of two regions of the image, the regions being angularly offset relative to an estimated center of the iris.

4. The method according to claim 2, wherein the step of evaluating correlations within said set of first characteristics comprises evaluating correlations of characteristics situated in a common direction passing through an estimated center of the iris.

5. The method according to claim 1, including an additional step of making a first measurement of a dimension of the iris of the first image and/or a second measurement of a dimension of the iris of the second image, followed by a step of comparing the first and/or second measurement with a reference value.

6. The method according to claim 1, wherein extracting the first set of first characteristics includes a preliminary step of detecting a substantially circular outline corresponding to an outer boundary of the iris.

7. The method according to claim 1, wherein extracting the second set of second characteristics includes a preliminary step of detecting a substantially circular outline corresponding to an outer boundary of the iris.

8. The method according to claim 6, wherein the first and/or second set of characteristics is extracted on a radial direction either going from the estimated center of the iris towards the outline of the iris, or from the outline of the iris towards the estimated center of the iris.

9. The method according to claim 1, including a step of comparing the first characteristics and/or the second characteristics with stored characteristics representative of attempts at fraud.

10. The identification terminal including image capture means for capturing an image of each iris of a person for identification, analysis means for analyzing the images, and an interface arranged to signal a fraud detection, the terminal being arranged to perform the method according to claim 1.

* * * * *